(12) United States Patent
Barras

(10) Patent No.: US 8,914,489 B2
(45) Date of Patent: Dec. 16, 2014

(54) METHOD OF PERSONALIZING AN APPLICATION EMBEDDED IN A SECURED ELECTRONIC TOKEN

(75) Inventor: Cyril Barras, Saint Maximin (FR)

(73) Assignee: Gemalto SA, Meudon (FR)

( * ) Notice: Subject to any disclaimer, the term of this patent is extended or adjusted under 35 U.S.C. 154(b) by 98 days.

(21) Appl. No.: 13/509,747

(22) PCT Filed: Nov. 29, 2010

(86) PCT No.: PCT/EP2010/068433
§ 371 (c)(1),
(2), (4) Date: May 14, 2012

(87) PCT Pub. No.: WO2011/073023
PCT Pub. Date: Jun. 23, 2011

(65) Prior Publication Data
US 2012/0254394 A1    Oct. 4, 2012

(30) Foreign Application Priority Data

Dec. 17, 2009    (EP) .................................... 09306258

(51) Int. Cl.
*G06F 15/173*    (2006.01)
*H04M 3/38*    (2006.01)
(Continued)

(52) U.S. Cl.
CPC ............. *G07F 7/1008* (2013.01); *H04M 3/387* (2013.01); *H04L 67/34* (2013.01); *H04M 3/42178* (2013.01); *H04M 2203/053* (2013.01); *H04L 69/18* (2013.01); *H04L 63/168* (2013.01); *H04L 63/18* (2013.01); *H04L 67/125* (2013.01); *H04L 67/025* (2013.01); *H04L 63/061* (2013.01); *G06Q 20/355* (2013.01); *G06F 9/546* (2013.01)
USPC ........................................................ 709/223

(58) Field of Classification Search
CPC ..... H04W 12/06; H04W 12/04; H04W 24/06; H04W 4/001; H04W 4/003; H04W 76/02; H04W 8/245; H04W 8/26; H04L 41/147; H04L 63/067; H04L 63/0853
USPC ........................................................ 709/223
See application file for complete search history.

(56) References Cited

U.S. PATENT DOCUMENTS 6,005,942 A  * 12/1999  Chan et al. ..................... 713/187
7,850,066 B2 * 12/2010  Breslin et al. ................. 235/375
(Continued)

FOREIGN PATENT DOCUMENTS

EP           1 965 596  A1    9/2008

OTHER PUBLICATIONS

International Search Report (PCT/ISA/210) issued on Feb. 25, 2011, by the European Patent Office as the International Searching Authority for International Application No. PCT/EP2010/068433.

(Continued)

*Primary Examiner* — Kevin Bates
*Assistant Examiner* — Ronak Patel
(74) *Attorney, Agent, or Firm* — Buchanan Ingersoll & Rooney PC

(57) ABSTRACT

The invention is a method of personalizing an application embedded in a secured electronic token which is able to manage first and second channels that allow to convey personalization data exchanged with a distant machine. Said first and second channels are of different types. The application is of Javacard™ type and comprises at least a function which is invoked when personalization data is received from the distant machine regardless of the channel used for conveying the personalization data.

5 Claims, 3 Drawing Sheets

(51) Int. Cl.
*H04L 29/08* (2006.01)
*H04M 3/42* (2006.01)
*G07F 7/10* (2006.01)
*H04L 29/06* (2006.01)
*G06Q 20/34* (2012.01)
*G06F 9/54* (2006.01)

(56) References Cited

U.S. PATENT DOCUMENTS

| | | | |
|---|---|---|---|
| 8,271,948 B2* | 9/2012 | Talozi et al. | 717/124 |
| 8,521,084 B2* | 8/2013 | Wane | 455/41.1 |
| 8,799,350 B2* | 8/2014 | Lagosanto et al. | 709/203 |
| 2002/0040936 A1* | 4/2002 | Wentker et al. | 235/492 |
| 2012/0172089 A1* | 7/2012 | Bae et al. | 455/558 |
| 2012/0254030 A1* | 10/2012 | Khan et al. | 705/41 |

OTHER PUBLICATIONS

Written Opinion (PCT/ISA/237) issued on Feb. 25, 2011, by the European Patent Office as the International Searching Authority for International Application No. PCT/EP2010/068433.
Vogt et al., "Middleware for Smart Cards", Middleware for Communications, 2004, Chapter 16, XP-002590001 (26 pages).
GlobalPlatform: "GlobalPlatform Card Specification 2.2", Mar. 2006, pp. 55-66, XP002590003.
GlobalPlatform: "GlobalPlatform Card Specification—Networked Framework Version 1.0", Sep. 2009, pp. 1-59, XP002590000.
GlobalPlatform: "Remote Application Management over HTTP Card Specification v2.2—Amendment B Version 1.1", Jun. 2009, pp. 1-25, XP002590002.

* cited by examiner

METHOD OF PERSONALIZING AN APPLICATION EMBEDDED IN A SECURED ELECTRONIC TOKEN

FIELD OF THE INVENTION

The present invention relates to the methods of personalizing an application embedded in a secured electronic token. It relates particularly to methods of personalizing applications which are embedded in Javacard™ tokens.

PRIOR ART

A secured electronic token such as a smart card may contain applications in the form of applets. On SIM cards, the applets may be accessed by a remote server via an over the air channel, known as OTA. OTA mechanism is defined by the ETSI SCP 102.225, ETSI-SCP 102.226, 3GPP 31.115, 3GPP 31.116 and GlobalPlatform (GP) version 2.2 for RAM standards. The OTA channel allows accessing data and applications which have been specifically developed for SIM cards. For example, smart cards intended to be used in Telecom domain or Machine To Machine (M2M) domain are able to manage an OTA communication. In particular SIM cards offer OTA features. These smart cards may also be accessed through the HyperText Transfer Protocol, usually called HTTP. In particular, the OMA-SCWS standard versions 1.0 and later define an administration protocol for the OTA administration of the Smart Card Web Server (SCWS) resources. This protocol is based on a HTTP POST message sent by an Admin Agent application to the OTA server. The Admin Agent application is located in the smart card. As a response, the OTA server sends back a SCWS administration command in the body of the HTTP POST response. According to the standard, a fixed Content-Type is specified in the header of this HTTP POST response. At the reception of this message, and thanks to the Content-Type, the Admin Agent application forwards the body of the HTTP POST response to the SCWS for the execution of the administration commands it contains. Then, once these administrative commands have been executed by the SCWS, another HTTP POST request is sent by the Admin Agent application in order to notify the OTA server of the commands execution results. This result data is put in the body of this HTTP POST message, and a specific Content-Type is set in the header of this HTTP POST. Using a similar principle, the GlobalPlatform® 2.2 standard (Amendment B "RAM over HTTP") and the ETSI 102 226 standard ("RFM over HTTP") have defined an administration protocol for the OTA administration of the Smart Card content. This channel is well suited for the Remote Applet Management (RAM) mechanism, for the administration of Security Domains, packages and applets. The GlobalPlatform® 2.2 standard specifies a fixed pattern of Content-Type to be used in HTTP POST request messages and HTTP POST response messages.

An application embedded in a smart card may be personalized through several channels. In particular, the application may be reached via the I/O mode as defined by ISO7816 standard. In this case, APDU commands are sent to the cards. APDU stands for Application Protocol Data Unit in accordance with the ISO 7816-4 standard. The application may also be remotely reached over Short Message Service (SMS) and CATTP (Card Application Toolkit Transport Protocol). This mechanism is well-suited for Remote Applet Management (RAM) and Remote File Management (RFM). Additionally, the application may also be remotely reached through HTTP over Bearer Independent Protocol (BIP) or Internet Protocol (IP).

When an application is intended to be reached through several kinds of channel, the application must comprise as many specific pieces of software as supported channel types. In other words, when personalizing an application, the part of the application which is activated depends on the type of the used channel. The mechanism of channel management requires the development of several pieces of software (also named methods) which are dedicated to a single channel type. The development of several pieces of software is costly and requires several testing steps. In addition, the development of several pieces of software increases the size of the application.

There is a need for providing a transparent mechanism allowing to personalize an application embedded in a secure electronic token in an unified way whatever the used channel.

SUMMARY OF THE INVENTION

An object of the invention is to solve the above mentioned technical problem.

The object of the present invention is a method of personalizing an application embedded in a secured electronic token. The secure token is capable of managing first and second channels which allow to convey personalization data that are exchanged with a distant machine. Said first and second channels are of different types. The application is of Javacard™ type and comprises at least a function. The function is invoked when a personalization data is received from the distant machine whatever the channel used for conveying said personalization data is.

In particular, the function may be a method of Javacard™ type.

Advantageously, the first channel may be the I/O mode as defined by ISO7816 standard and the function may be the Process(APDU) method as defined in Javacard™ standard.

In a preferred embodiment, the second channel may be the SMS over Card Application Toolkit Transport Protocol.

Advantageously, the personalization data may be comprised in a message that contains an identifier meaning that the function is to be invoked.

The message may comprise a TP-PID field which comprises the identifier.

In another embodiment, the second channel may be one of HTTP or HTTPs over Bearer Independent Protocol or Internet Protocol.

Advantageously, the personalization data may be comprised in a message that contains an identifier which means that the function is to be invoked.

Advantageously, the message may comprise a content type field and the identifier may be a preset value of the content type field.

Another object of the invention is a secure electronic token capable of managing first and second channels allowing to convey personalization data that is exchanged with a distant machine. Said first and second channels are of different types. The secure electronic token comprises an application of Javacard™ type. The application comprises at least a function. The secure electronic token comprises a means capable of invoking said function when a personalization data is received from the distant machine whatever the channel used for conveying the personalization data is.

Advantageously, the first channel may be the I/O mode as defined by ISO7816 standard and the function may be the Process(APDU) method as defined in Javacard™ standard.

Advantageously, the second channel may be the SMS over Card Application Toolkit Transport Protocol.

In one embodiment, the personalization data may be comprised in a message. The message may comprise a TP-PID field and the secure token may comprise a second means capable of checking a value of a preset part of the TP-PID field.

The second channel may be one of HTTP or HTTPs over Bearer Independent Protocol or Internet Protocol.

Advantageously, the personalization data may be comprised in a message which contains a content type field. The secure token may comprise a second means capable of checking the value of the content type field.

In a preferred embodiment, the secure electronic token may be a smart card.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of secured electronic token intended to contain applications which are compliant with the Javacard™ standard. The present invention may also apply to secure electronic tokens using the HyperText Transfer Protocol Secure, usually called HTTPS. In this specification, the secured electronic token is a SIM card but it could be any other kind of secured electronic device able to receive personalization data through several types of channel. A secured electronic token may be portable and may contain one or several memories, a microprocessor and a communication interface. In this specification, the secured electronic token is connected to a host machine. In particular, the host machine may be a mobile phone or telecom terminal. The secure electronic token accesses a remote server through the host machine. Alternatively, messages may be directly exchanged between the secure electronic token and the server machine without any intermediate host machine.

The present invention relies on the fact that a unique method is invoked in the application to be personalized whatever the channel used for sending personalization data to the token which comprises the application.

Thanks to the invention, a distant server may perform a remote unified personalization of applications that were not designed for. The invention allows managing legacy applications.

An advantage of the invention is to allow to use the same personalization script whatever the origin of the script. In other words, the same personalization script may be used through I/O, TS-31.115 SMS or HTTP channel.

Figure 1:
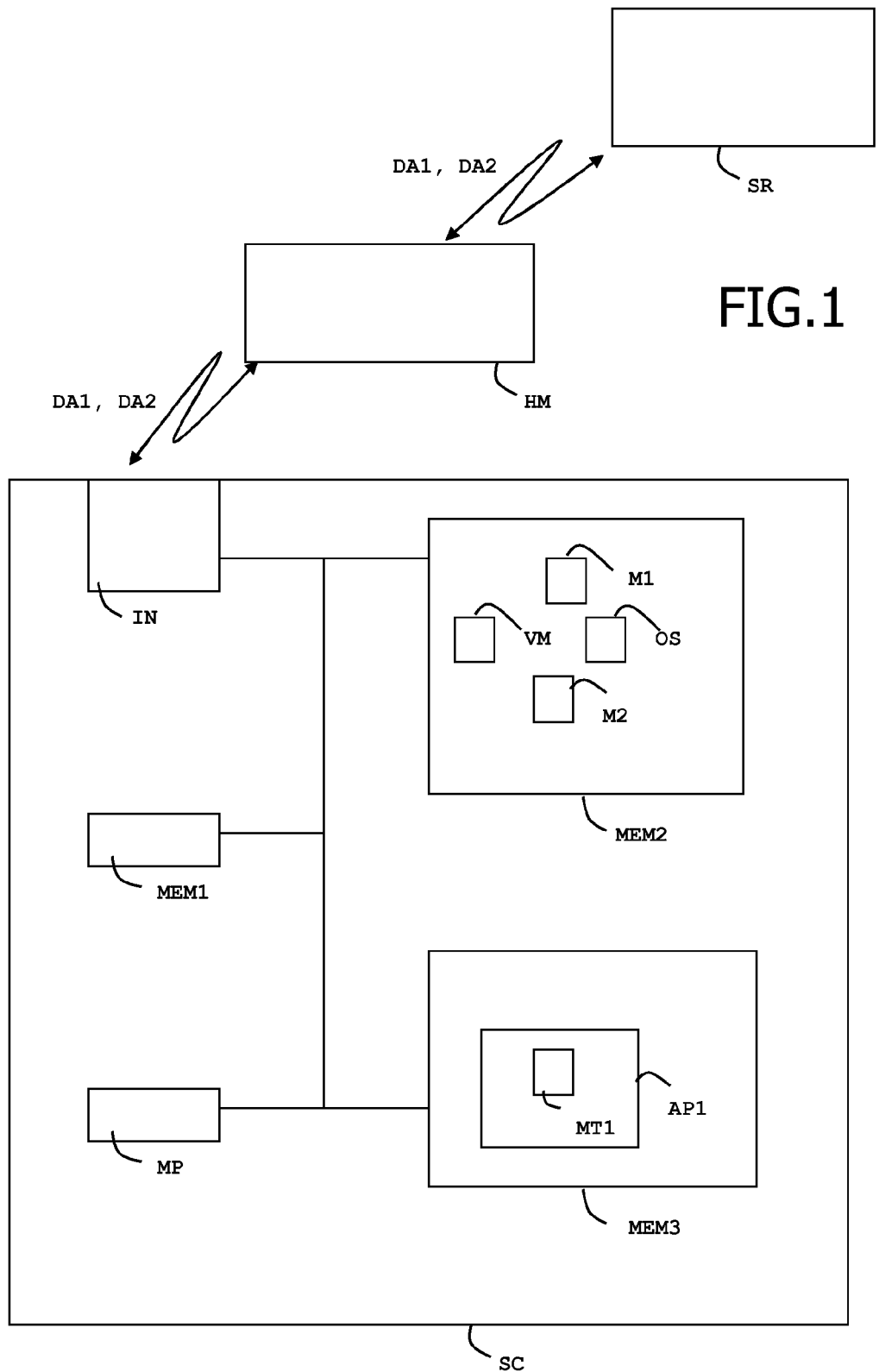
FIG. 1 depicts schematically an example of architecture of a secured electronic token which communicate with a distant server via a host machine according to the invention.

FIG. 1 shows the architecture of a secure electronic token SC of SIM card type according to a preferred embodiment of the invention. The token SC communicates with a distant server SR via a host machine HM.

The secure electronic token SC comprises a working memory MEM1 of RAM type, two non volatile memories MEM2 and MEM3, a microprocessor MP and a communication interface IN.

The non volatile memory MEM3 comprises one applet AP1 which has a method MT1. The method MT1 is the Process(APDU) method as defined in Javacard™ standard.

The non volatile memory MEM2 comprises an operating system OS, a Java Virtual Machine VM and two means M1 and M2. The Virtual Machine VM may be a part of the operating system OS. The two means M1 and M2 may be a part of the operating system OS.

The two memories MEM2 and MEM3 may be implemented as any combinations of one, two or more memories. These memories may be NAND flash or EEPROM memory or another type of non volatile memory.

The host machine HM is a mobile phone. The SIM card SC is intended to exchange messages with the telecom handset HM through the communication interface IN. The telecom handset HM is intended to exchange messages with a distant server SR via the OTA mechanism. Thus the SIM card SC may exchange messages with the distant server SR through the connected mobile phone HM.

The applet AP1 is an application that may be personalized thanks to personalization data DA1 or DA2 provided by the distant machine SR.

The means M1 is capable of invoking the method MT1 when the personalization data DA1 or DA2 is received from the distant machine SR. The means M1 call the method MT1 regardless of the channel that has been used for conveying the personalization data.

The personalization data is received by the token SC through a message which comprises several fields. The means M2 is able to check the value of a preset field of the received message. The behavior of means M2 is described in the examples of FIG. 2 and FIG. 3.

Figure 2:
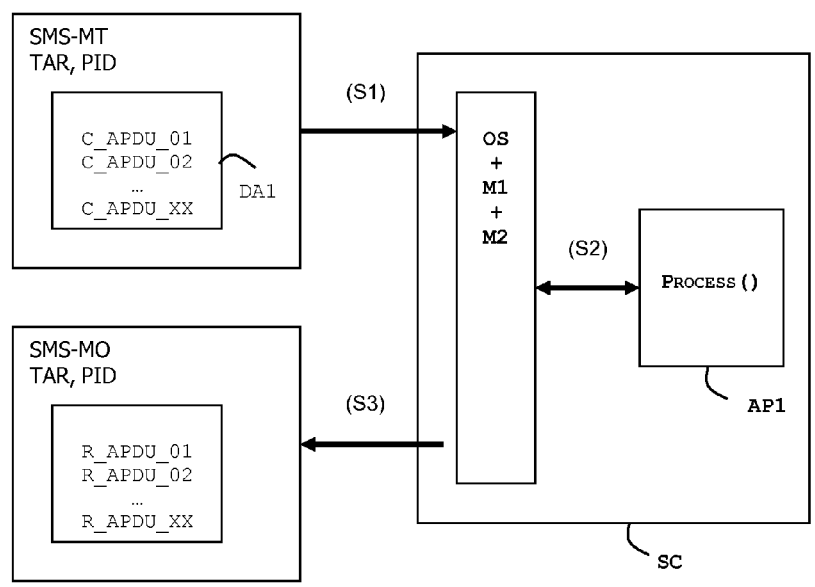
FIG. 2 is a first example of message exchanges between a distant server and an application embedded in a secure token according to the invention.

FIG. 2 shows an example of a sequence of messages received and sent by the token SC according to the invention. In this first embodiment, the personalization messages are sent through the SMS mechanism.

At first step S1 the token SC receives a SMS-MT (Short Message Service-Mobile Terminated) comprising three elements: a TAR, a TP-Protocol-Identifier field PID and a personalization script DA1.

The TAR contains an identifier of the targeted applet AP1. For example the TAR may contain the value "456912" which corresponds to the applet AP1. The TAR is coded with 3 bytes which belong to the applet AID.

The personalization script DA1 contains a list of APDU commands C_APDU_01, C_APDU_02, ..., C_APDU_XX which are intended to be executed in the targeted applet.

The field PID is a Protocol Identifier (also named TP-PID) field as defined by the 3GPP TS 23.040 standard. The field PID contains a bit which is set to the value <<1>>. This value means that the method MT1 must be invoked in the targeted applet for personalization purpose. In another embodiment, the value <<0>> may mean that the method MT1 must be called in the targeted applet for personalization purpose.

Alternatively, a preset value of the whole field PID may be used instead of a single bit value. For example, the preset value "011000000b" may be used. The preset value may be selected in the following range [011000000b, 01111011 b].

The means M2 checks the value of the preset bit in the field PID.

Since the preset bit contains the value <<1>>, the method MT1 is invoked in the targeted applet AP1 at step S2. In the embodiment of FIG. 2, the method MT1 is the Process (APDU) method. The method MT1 is called for each APDU command of the personalization script DA1. Thus a first invocation Process(APDU, C_APDU_01) is performed. Then a second invocation Process(APDU, C_APDU_02) is performed and so on, until the last invocation Process(APDU, C_APDU_XX). The applet AP1 executes all APDU commands of the script DA1 in succession. This way the full personalization script DA1 is executed into the targeted applet AP1.

At a third step S3 the token SC builds a SMS-MO (SMS-Mobile Originated) and sends the SMS-MO in response to the SMS-MT. The SMS-MO comprises three elements: the TAR, the TP-Protocol-Identifier field PID and result of the personalization script DA1.

The TAR and the PID of the SMS-MO are similar to the TAR and PID of the corresponding SMS-MT.

The result of the personalization script DA1 contains a list of responses for each APDU command of the personalization script DA1: R_APDU_01, R_APDU_02, . . . , R_APDU_XX. Thus there are list of couples command/response (e.g. C_APDU_YY/R_APDU_YY). The SMS-MO is sent to the distant server SR thanks to the Telecom handset HM.

Alternatively, the generation of the SMS-MO may be performed progressively as and when executing APDU commands.

Alternatively, the checking of step S2 may show that the preset bit does not contain the value corresponding to the request of method MT1 call. In this case, the personalization script DA1 is managed in a legacy manner for the applet AP1. Since the personalization script DA1 has been received through SMS, the script content is executed in the applet AP1 thanks to processToolkit(short event) with event set to ENVELOPE_DATA_DOWNLOAD (not drawn at FIG. 2).

Figure 3:
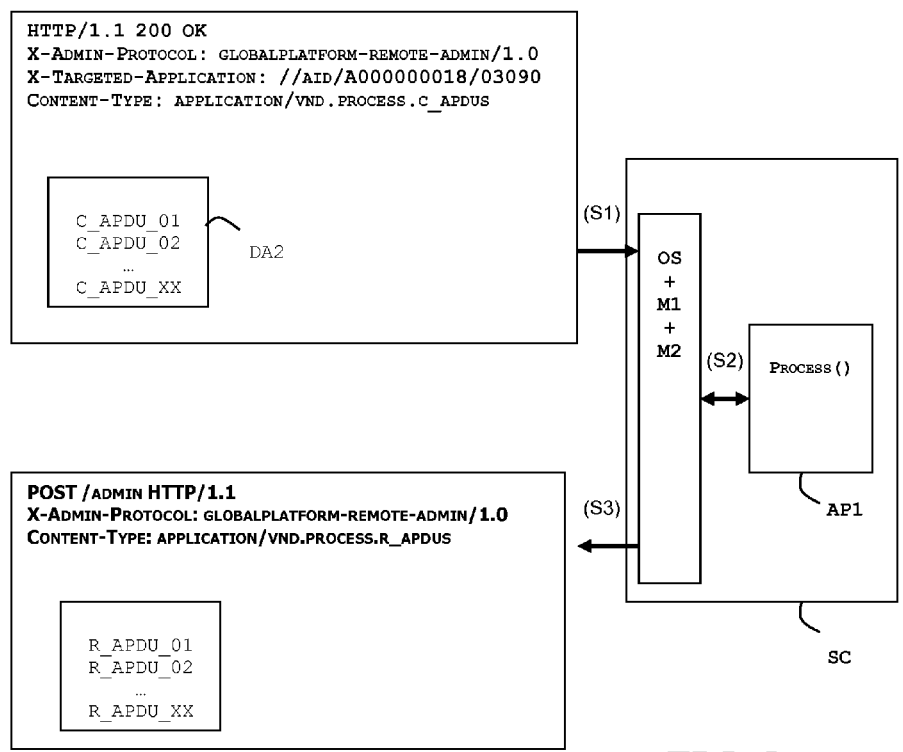
FIG. 3 is a second example of message exchanges between a distant server and an application embedded in a secure token according to the invention.

FIG. 3 shows another example of a sequence of messages received and sent by the token SC according to the invention. In this second embodiment, the personalization messages are sent through the HTTP mechanism. In particular, the messages may be conveyed thanks to IP/HTTP mechanism.

At first step S1 the token SC receives a HTTP response comprising four elements: a X-Admin-Protocol, a X-Targeted-Application, a Content-Type and a personalization script DA2.

The X-Admin-Protocol contains "globalplatform-remote-admin/1.0". The X-Admin-Protocol field is defined in the GP 2.2 Amendment B RAM over http.

The X-Admin-Targeted-Application contains an identifier of the targeted applet AP1. For example the X-Targeted-Application may contain the value "//aid/A000000018/03090" which corresponds to the applet AP1.

The personalization script DA2 contains a list of APDU commands C_APDU_01, C_APDU_02, . . . , C_APDU_XX which are intended to be executed in the targeted applet.

The field Content-Type contains the value "vnd.process.c_apdus". This value means that the method MT1 must be invoked in the targeted applet for personalization purpose.

The means M2 checks the value of the field Content-Type.

Since the Content-Type contains the value <<vnd.process.c_apdus>>, the method MT1 is called in the targeted applet AP1 at step S2. In the embodiment of FIG. 3, the method MT1 is the Process(APDU) method. The method MT1 is invoked for each APDU command comprised in the personalization script DA2. Thus a first call Process(APDU, C_APDU_01) is performed. Then a second call Process (APDU, C_APDU_02) is performed and so on until the last call Process(APDU, C_APDU_XX). The applet AP1 successively executes all APDU commands of the script DA2. This way the full personalization script DA2 is executed into the targeted applet AP1.

At a third step S3 the token SC sends a HTTP Post request in response to the HTTP response. The HTTP Post comprises three elements: a X-Admin-Protocol, a Content-Type and the result of the personalization script DA2.

The X-Admin-Protocol contains "globalplatform-remote-admin/1.0". The field Content-Type contains the value "vnd.process.r_apdus". This value of the Content-Type field allows the distant server SR to analyze the content of the HTTP Post request.

The result of the personalization script DA2 contains a list of responses for each APDU command of the personalization script DA2: R_APDU_01, R_APDU_02, . . . , R_APDU_XX. The HTTP Post message is sent to the distant server SR thanks to the mobile phone HM.

Advantageously, the HTTP-TLS mechanism may be used for exchanging personalization messages between the token SC and the distant machine SR.

Thanks to the invention, an application embedded in a secure electronic token may be managed or personalized in a unified way. In particular, the application may be reached through I/O contact mode or remotely through 2G or 3G or CDMA networks. The application may also be remotely reached through IP network and Long Term Evolution (LTE also called 4G) network.

The invention claimed is:

1. A method of personalizing an application embedded in a secured electronic token, said token being configured to manage first and second channels for conveying personalization data exchanged with a distant machine, said first channel being the input/output (I/O) mode as defined by the ISO7816 standard and said second channel being an SMS over Card Application Toolkit Transport Protocol, said application being of the Javacard™ type and comprising at least a function, the method comprising:

receiving, in the secured electronic token, a personalization data, from the distant machine through said second channel, wherein (1) said personalization data is comprised in a message containing an identifier which specifies if the function is to be invoked and (2) said personalization data is a script including a plurality of Application Protocol Data Unit (APDU) commands; and when the identifier specifies that said function is to be invoked, invoking said function, in the application, for running every APDU command of said script, said function being invoked irrespective of the channel used for conveying said personalization data, wherein said function is the Process(APDU) method as defined in the Javacard™ standard.

2. A method according to claim 1, wherein said message comprises a TP-PID field and wherein said TP-PID field comprises the identifier.

3. A secure electronic token configured to manage first and second channels for conveying personalization data exchanged with a distant machine, said first channel being the input/output (I/O) mode as defined by the ISO7816 standard and said second channel being an SMS over Card Application Toolkit Transport Protocol, said secure electronic token (i) comprising an application of the Javacard™ type including at least a function, and (ii) being configured to receive a personalization data from the distant machine through said second channel, wherein said personalization data is (i) comprised in a message containing an identifier which specifies if the function is to be invoked and (ii) is a script including a plurality of Application Protocol Data Unit (APDU) commands, said secure electronic token comprising:

a means configured to invoke said function in the application for running every APDU command of said script when the identifier specifies that said function is to be invoked, said function being invoked irrespective of the channel used for conveying said personalization data, wherein said function is the Process(APDU) method as defined in the Javacard™ standard.

4. A secure electronic token according to claim 3, wherein said message comprises a TP-PID field and wherein said token comprises a second means configured to check the value of a preset bit of the TP-PID field.

5. A method of personalizing an application embedded in a secured electronic token, said token being configured to manage first and second channels for conveying personalization data exchanged with a distant machine, said first channel being the input/output (I/O) mode as defined by the ISO7816 standard and said second channel being an SMS over Card Application Toolkit Transport Protocol, said application being of the Javacard™ type and comprising at least a function, the method comprising:

receiving, in the secured electronic token, a personalization data, from the distant machine through said second channel, wherein (1) said personalization data is comprised in a message containing an identifier which specifies if the function is to be invoked and (2) said personalization data is a script including a plurality of Application Protocol Data Unit (APDU) commands; and when the identifier does not specify that said function is to be invoked, executing, by processToolkit, every APDU command of said script, said processToolkit being invoked irrespective of the channel used for conveying said personalization data.

* * * * *